(12) United States Patent
Edwards et al.

(10) Patent No.: US 12,296,483 B2
(45) Date of Patent: May 13, 2025

(54) DYNAMIC MACHINE LEARNING SYSTEMS AND METHODS FOR IDENTIFYING PICK OBJECTS BASED ON INCOMPLETE DATA SETS

(71) Applicant: Plus One Robotics, Inc., San Antonio, TX (US)

(72) Inventors: Shaun Edwards, San Antonio, TX (US); Daniel Grollman, Boulder, CO (US)

(73) Assignee: Plus One Robotics, Inc., San Antonio, TX (US)

( * ) Notice: Subject to any disclaimer, the term of this patent is extended or adjusted under 35 U.S.C. 154(b) by 167 days.

(21) Appl. No.: 17/719,108

(22) Filed: Apr. 12, 2022

(65) Prior Publication Data

US 2022/0324098 A1    Oct. 13, 2022

Related U.S. Application Data

(60) Provisional application No. 63/173,568, filed on Apr. 12, 2021.

(51) Int. Cl.
*B25J 9/16*     (2006.01)
*B25J 19/02*    (2006.01)

(52) U.S. Cl.
CPC .............. *B25J 9/163* (2013.01); *B25J 9/161* (2013.01); *B25J 9/1612* (2013.01); *B25J 9/1682* (2013.01); *B25J 9/1697* (2013.01); *B25J 19/023* (2013.01)

(58) Field of Classification Search
CPC ..................................................... B25J 19/023
See application file for complete search history.

(56) References Cited

U.S. PATENT DOCUMENTS

2019/0270201 A1    9/2019  Ding et al.
2020/0319627 A1   10/2020  Edwards et al.
(Continued)

OTHER PUBLICATIONS

Daniel H. Grollman et al., "Dogged Learning for Robots," Proceedings 2007 IEEE International Conference on Robotics and Automation. Ieee, 2007, pp. 2483-2488.
(Continued)

*Primary Examiner* — Jaime Figueroa
*Assistant Examiner* — Jerrod Irvin Davis
(74) *Attorney, Agent, or Firm* — Outlier Patent Attorneys, PLLC

(57) ABSTRACT

The present invention relates to systems and methods for accounting for edge cases (i.e. tail data) in automated decision making systems, for example automated robotic picking systems. The systems and methods provide for retraining machine learning (ML) models so that the edge cases can be handled in a manner that requires less (or no) human intervention. The disclosed systems and methods create updated ML models, replacement ML models, and/or supplementary ML models that can provide better performance (e.g. improved automated robotic picking) when edge cases are encountered. Furthermore, the present inventions disclose systems and methods for obtaining training data faster and in a more cost effective manner, which enables the systems and methods disclosed herein to update models at a faster rate, thereby enabling broader, system-wide handling of edge cases in a more effective and efficient manner.

20 Claims, 7 Drawing Sheets

(56) References Cited

U.S. PATENT DOCUMENTS

2020/0361083 A1    11/2020  Mousavian et al.
2021/0023711 A1*    1/2021  Lee ..................... B25J 9/1697
2021/0031365 A1     2/2021  Demirdjian et al.
2021/0216914 A1*    7/2021  Kimura ................ G06F 16/53
2022/0288783 A1*    9/2022  Sundermeyer ........ B25J 9/1669

OTHER PUBLICATIONS

PCT International Search Report and Written Opinion dated Aug. 16, 2022, PCT International Application No. PCT/US22/24476, pp. 1-8.

Extended European Search Report (EESR) of counterpart European patent application No. 22788795.7, dated Mar. 31, 2025.

Sepehr Valipour et al: "Incremental Learning for Robot Perception through Hri", Arxiv.Org, Cornell University Library, 201 Olin Library Cornell University Ithaca, NY 14853, Jan. 17, 2017 (Jan. 17, 2017), XP080749613, DOI: 10.1109/IROS.2017.8206106.

* cited by examiner

DYNAMIC MACHINE LEARNING SYSTEMS AND METHODS FOR IDENTIFYING PICK OBJECTS BASED ON INCOMPLETE DATA SETS

CROSS-REFERENCE TO RELATED APPLICATIONS

This application claims the benefit of U.S. Provisional Application 63/173,568, filed Apr. 12, 2021, titled "DYNAMIC MACHINE LEARNING SYSTEMS AND METHODS FOR IDENTIFYING PICK OBJECTS BASED ON INCOMPLETE DATA SETS," which is herein incorporated by reference in its entirety.

BACKGROUND

Traditional machine learning ("ML") systems and ML picking models that are deployed in automated industrial robotic picking systems (i.e. models that identify pick points for a robot to pick an item or an object from a picking tote or a conveyor belt) have known drawbacks that limit their performance in those systems. For example, a goal for traditional ML models is to build a general model and avoid overfitting to edge cases or other particular data. In other words, given a distribution of scenarios in training data, most common ML models inherently focus on the most commonly occurring scenarios (i.e. on the data at the head of a long-tailed distribution). As a result most ML models often perform poorly on the tail (less common) scenarios. In most ML applications, this may be an acceptable outcome. However, in automated industrial robotic picking systems, this outcome results in poor performance in edge case scenarios (i.e. tail data), which generally causes breakdowns when the system encounters these scenarios or may require human intervention. The common approach to solve this problem is to train the model with more training data, which may be difficult, as described below. Generally, the more edge cases or tail scenarios are encountered, the better the training with respect to those scenarios; however the overall frequency of tail scenarios, by definition, is less than scenarios at the head of a distribution curve. Moreover, new data may introduce or define new tail data that may not include enough instances to properly train an ML system.

Updating the ML models to account for tail data is not always feasible because ML models in robotic picking systems are generally static and are updated only when new training data becomes available. However, obtaining new training data is often an expensive and time consuming process. For example, new training data may need to be generated by human reviewers who need to identify appropriate pick data from image data or other types of raw data. Pick data generally refers to at least one pick point where a robotic picking unit should attempt to pick an object and/or at least one object classification or identifier. User selected pick data may have to be translated into machine readable data for appropriate processing by ML training system. In industrial picking systems, voluminous data may be needed in order to improve the pick performance, and in general, it may take quite some time to obtain this quantity and type of training data. If a deployed ML model is unable to identify pick points in certain types of incoming pick requests, then, the time that it could take to update a model may cause repeated failures that may not be corrected for quite some time (i.e. until new training data is made available).

One approach to obtaining new training data faster and perhaps more inexpensively is to use machine labeled data in combination with human intervention data. For example, human generated intervention data may be used to train an ML classifier or detector (the human intervention data being generated when a classification system fails to provide an appropriate pick result). However, this approach is generally imperfect as well. Human intervention data is typically incompletely labeled data because human intervention data, being focused on speed, only provides one or a few potential pick points, usually at a lower resolution and precision than traditional training data. For machine learning systems to retrain a picking model, the training data preferably should be more completely labeled such that a plurality of, and in many cases all, potential pick points are labeled (at a high degree of resolution) as well as including labels on points which do not qualify as pick points and should be avoided. In addition to the above, human generated data may also be incorrect such that human generated pick points do not lead to a successful pick operation, such as grabbing an object and moving the object to a placement location without collision with or disruption of objects and/or items in and around the picking environment. In these scenarios, training using such data would have detrimental effects on a picking model.

Indeed, currently available systems for using and deploying ML models in industrial automated robotic picking systems do not fully support the desired outcomes in these systems. Most ML models cause breakdowns (or require human intervention) when edge cases are encountered, which generally slows the system and creates inefficiencies. Moreover, the process of updating ML models in these systems is often slow, expensive, and does not address issues caused by edge cases or scenarios in the tail of an expected distribution curve of encountered scenarios.

SUMMARY

The present invention addresses these issues by providing systems and methods for accounting for edge cases (i.e. tail data) in a manner that can be handled by ML systems and models without requiring human intervention. More specifically, the presently disclosed systems and methods create updated ML models, replacement ML models, and/or supplementary ML models that can provide better pick performance when edge cases (tail data) are encountered. Moreover, the present inventions disclose systems and methods for obtaining training data faster and in a more cost effective manner, which enables the systems and methods disclosed herein to update static models at a faster pace, which enables the broader system to handle edge cases more effectively.

More specifically, the present systems and methods enable the generation of new ML models ("new" models hereinafter also refer to updated models, supplementary modes, replacement models, etc. unless specified otherwise) that are trained on edge case (tail) data that the previously deployed ML model was unable to process or unable to process correctly. For example, in a human-in-the-loop robotic picking system, pick requests that cannot be processed by an ML model (or which are not processed correctly) by an ML model may be sent to a human reviewer. The human reviewer may provide pick data in those specific instances to enable the automated picking system to continue operations. In one embodiment, the human review data may be used to train a new or re-train a currently deployed ML model. The newly trained or retrained model may be tested to performance, and if the new model performs better, then the new model may be deployed into the automated robotic picking system as a new/updated ML model, supplementary model, etc. A variety of different testing metrics may be used as described in greater detail below. Moreover, the update process may happen in real time or near-real-time as pick data is provided by human reviewers or based on other characteristics. In this manner, ML models can be trained to handle edge cases more efficiently and deployed more quickly to improve efficiency and reduce costs associated with human interventions and/or system breakdowns.

In addition, the present systems and methods enable the generation and/or augmentation of training data to make it usable for training systems. Generally, pick data that is provided by human reviewers is incomplete for training purposes. For example, human reviewers, being focused on speed, only provide one or a few potential pick points, usually at a lower resolution and precision than traditional training data. As mentioned above, for machine learning systems to appropriately retrain a picking model, the training data preferably should be more completely labeled such that a plurality of potential pick points are labeled (at a high degree of resolution) as well as requiring labels on points which do not qualify as pick points and should be avoided. As such, the inventive systems and methods provide a mechanism for augmenting the pick data that is provided by human reviewers to obtain additional pick points, bounding boxes, objects of interest, etc., at an appropriate resolution, to appropriately train the ML models. The systems and methods disclosed herein enable the robotic systems to identify pick data provided by human reviewers that is reliable (or, in other words, pick data that succeeded in effectuating a desired outcome by, for example, picking or displacing a desired object).

BRIEF DESCRIPTION OF THE DRAWINGS

The accompanying drawings illustrate several embodiments and, together with the description, serve to explain the principles of the invention according to the embodiments. It will be appreciated by one skilled in the art that the particular arrangements illustrated in the drawings are merely exemplary and are not to be considered as limiting the scope of the invention or the claims herein in any way.

DETAILED DESCRIPTION

Figure 1:
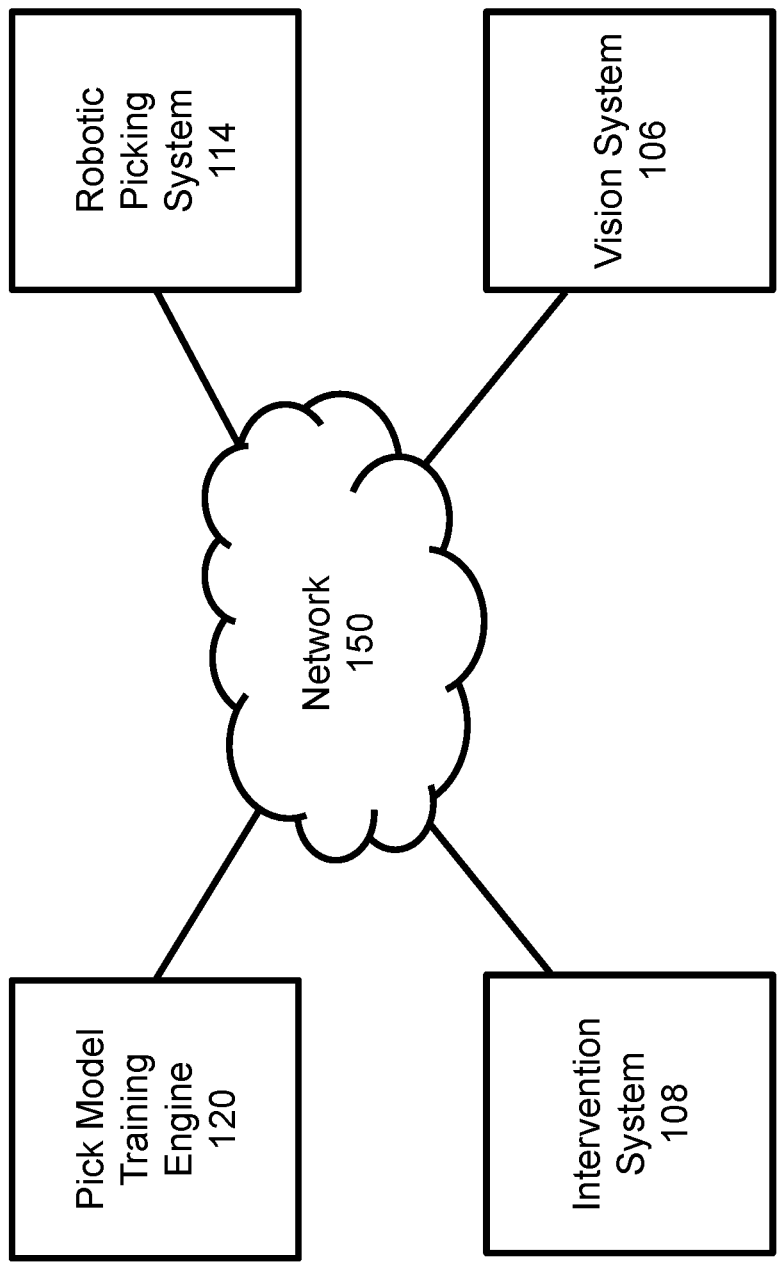
FIG. 1 illustrates a system for automated robotic picking in accordance with an exemplary embodiment of the invention.

One or more different embodiments may be described in the present application. Further, for one or more of the embodiments described herein, numerous alternative arrangements may be described; it should be appreciated that these are presented for illustrative purposes only and are not limiting of the embodiments contained herein or the claims presented herein in any way. One or more of the arrangements may be widely applicable to numerous embodiments, as may be readily apparent from the disclosure. In general, arrangements are described in sufficient detail to enable those skilled in the art to practice one or more of the embodiments, and it should be appreciated that other arrangements may be utilized and that structural, logical, software, electrical and other changes may be made without departing from the scope of the embodiments. Particular features of one or more of the embodiments described herein may be described with reference to one or more particular embodiments or figures that form a part of the present disclosure, and in which are shown, by way of illustration, specific arrangements of one or more of the aspects. It should be appreciated, however, that such features are not limited to usage in the one or more particular embodiments or figures with reference to which they are described. The present disclosure is neither a literal description of all arrangements of one or more of the embodiments nor a listing of features of one or more of the embodiments that must be present in all arrangements.

Headings of sections provided in this patent application and the title of this patent application are for convenience only and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible embodiments and in order to more fully illustrate one or more embodiments. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the embodiments, and does not imply that the illustrated process is preferred. Also, steps are generally described once per aspect, but this does not mean they must occur once, or that they may only occur once each time a process, method, or algorithm is carried out or executed. Some steps may be omitted in some embodiments or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other embodiments need not include the device itself.

Techniques and mechanisms described or referenced herein will sometimes be described in singular form for clarity. However, it should be appreciated that particular embodiments may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various embodiments in which, for example, functions may be executed out of order from that shown or discussed, including substantially concurrently or in reverse order, depending on the functionality involved, as would be understood by those having ordinary skill in the art.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

FIG. 1 illustrates a block diagram of an exemplary system for dynamically retraining ML models based on incomplete data sets in accordance with certain aspects of the disclosure. The exemplary system 100 may include any number of computing devices that may be configured to assist with picking up and/or moving one or more objects. For example, as seen in FIG. 1, the system comprises a robotic picking system 114, a vision system 106, an intervention system 108, a pick model training engine 120, and a network interface 150. The vision system 106 and robotic picking system 114 may work together as an automated robotic picking system. The various computing devices described herein are exemplary and for illustration purposes only. The system may be reorganized or consolidated, as understood by a person of ordinary skill in the art, to perform the same tasks on one or more other servers or computing devices without departing from the scope of the invention.

As a general overview, in an exemplary automated robotic picking application, a vision system 106 identifies pick data for picking an object within a pick area (e.g. picking bin, a conveyor belt, pallet, etc.) and the identified pick pick data is used to control a robotic picking system 112 (e.g. a robotic arm or an end effector) to pick an identified object. An intervention system may serve to allow a human-in-the-loop to act as a crew-chief to load balance the system (e.g. if the human is managing multiple robotic end effectors), and/or the human crew-chief may be called upon to help identify pick data when the vision system requires assistance. Some exemplary scenarios where a vision system may require assistance comprise at least one of a vision system failing to identify pick data, returning insufficient pick data, returning pick data with a confidence below a certain threshold, returning pick data that are out of bounds (or outside of the robot's reach), etc. In those instances (i.e. when a vision system's pick points are not actionable by a robot), the human crew-chief may be presented with the problem and may be asked to identify pick points or pick regions to pick an identified object. The human crew-chief may provide, in one embodiment, coordinates for a successful pick. In other embodiments, the human crew-chief may simply select one or more points on a graphical user interface containing a 2D and/or a 3D image of a picking bin and/or a conveyor belt. The selected point(s) within the GUI may be translated to pick point coordinates and may be provided to the robotic system to pick an object. This human generated pick data 201 may be continually built, expanded or rewritten over time as more input requests from a human crew-chief are requested as part of robotic picking processes.

Robotic picking system 114 comprises a system of components that operate to perform robotic picking and moving of objects. The robotic picking unit 114 may comprise a robotic arm and end effector for picking and moving objects. Exemplary end effectors comprise grip elements such as suction cups, pincers, and claws, as well as other manipulation components suitable for picking and moving objects as would be apparent to a person of ordinary skill in the art. The robotic picking unit 114 may perform automated or semi-automated robotic picking operations under guidance from a vision system 106 and at least one pick model.

Vision system 106 identifies pick data for picking an object within a picking area for use by a robotic arm or end effector to pick an identified object. The vision system 106 employs a pick model, such as a trained machine learning model, in order to identify pick data. In one aspect, vision system 106 analyzes 2D and/or 3D image data of a picking area to identify pick data. Vision system 106 may perform at least one of object detection and object classification in order to locate and identify objects within a pick area associated with robotic picking system 114. In some scenarios, the vision system is unable to identify pick data or the pick data identified by the vision system is insufficient to execute a picking operation (e.g. the vision system fails to identify pick data, returns insufficient pick data, returns pick data with a confidence below a certain threshold, returns pick data that are out of bounds (or outside of the robot's reach), etc). When these scenarios arise, interventional assistance may be requested from an intervention system 108 to aid in picking decisions and operations. The vision system 106, more generally, refers to any autonomous decision making system, including planning, speech recognition, etc., that may be applied to make decisions, including, but not limited to pick decisions, as described herein.

The intervention system 108 may involve at least one of human-in-the-loop interaction and artificial intelligence interaction in order to provide intervention data to support vision system 106. Intervention system 108 may comprise a remote intervention system located at a location different from at least one of robotic picking system 114 and vision system 106. Intervention system 108 may comprise at least one of an interface for a human-in-the-loop to provide input and an artificial intelligence (AI) interface for an AI system to provide input. In a human-in-the-loop based approach, a human may be prompted, via intervention system 108, to at least one of provide pick data, such as pick points (or pick point data) and/or classification data, and confirm pick data generated by vision system 106, in order to enable picking operations to continue. In general, when vision system 106 encounters uncertainty associated with object detection and classification or an appropriate pick plan such as pick points, the remote intervention system 108 receives pick request data and, in return, provides intervention data comprised of at least one of human generated response data and AI generated response data associated with the pick request data. The intervention data may comprise at least one of confirmation that object detection and/or classification are correct, adjustments to object detection and/or classification if necessary, verification of pick data, and adjustments to pick data. For example, in a scenario where the vision system 106 is uncertain as to the differentiation of two adjacent pick objects or has determined a lower than required confidence in said differentiation, the intervention system 108 provides additional information to the vision system 106 so that robotic picking can continue. As another example, a scenario may arise where the vision system 106 determines a lower than required confidence associated with the classification of a pick object and hence is uncertain how to handle this object. When this occurs, the intervention system 108 provides additional information to the vision system 106 so that picking operations can continue.

Pick model training engine 120 trains a machine learning pick model. Training comprises at least one of retraining an existing pick model and training supplementary pick models. Pick model training engine 120 may use at least one of pick request data and intervention data, where the pick request data and the intervention data are associated with uncertainties arising from an existing or previous pick model used in a robotic picking environment. The pick model training engine 120 may perform verification based on information received from a robotic picking unit 114 in order to determine appropriate use of intervention data for training purposes. The pick model training engine 120 augments pick request data based on intervention data in order to increase the amount of labeled data points and optionally achieve a completely labeled dataset. Once sufficient pick request data and/or intervention data has been obtained, the pick model training engine 120 trains a new pick model. Training may comprise artificial intelligence, such as using machine learning to retrain an existing pick model or train one or more supplementary pick models. Once a new pick model has been trained, the model is tested by comparison with existing model(s) and/or an expected performance metric. If the new pick model outperforms an existing pick model(s) and/or satisfies a performance metric, the new pick model is deployed for use in automated robotic picking applications. In other embodiments, as described below, the new model may supplement an existing model, or may be integrated into an existing model.

Network cloud 150 generally represents a network or collection of networks (such as the Internet or a corporate intranet, or a combination of both) over which the various components illustrated in FIG. 1 (including other components that may be necessary to execute the system described herein, as would be readily understood to a person of ordinary skill in the art) are connected and able to communicate. In particular embodiments, network 150 is an intranet, an extranet, a virtual private network (VPN), a local area network (LAN), a wireless LAN (WLAN), a wide area network (WAN), a metropolitan area network (MAN), a portion of the Internet, or another network 150 or a combination of two or more such networks 150. One or more links connect the systems and databases described herein to the network 150. In particular embodiments, one or more links each includes one or more wired, wireless, or optical links. In particular embodiments, one or more links each includes an intranet, an extranet, a VPN, a LAN, a WLAN, a WAN, a MAN, a portion of the Internet, or another link or a combination of two or more such links. The present disclosure contemplates any suitable network 150, and any suitable link for connecting the various systems and databases described herein.

In particular embodiments, each system or engine may be a unitary server or may be a distributed server spanning multiple computers or multiple datacenters. Systems, engines, or modules may be of various types, such as, for example and without limitation, web server, news server, mail server, message server, advertising server, file server, application server, exchange server, database server, or proxy server. In particular embodiments, each system, engine or module may include hardware, software, or embedded logic components or a combination of two or more such components for carrying out the appropriate functionalities implemented or supported by their respective servers. For example, a web server is generally capable of hosting websites containing web pages or particular elements of web pages. More specifically, a web server may host HTML files or other file types, or may dynamically create or constitute files upon a request, and communicate them to clients devices or other devices in response to HTTP or other requests from clients devices or other devices. A mail server is generally capable of providing electronic mail services to various client devices or other devices. A database server is generally capable of providing an interface for managing data stored in one or more data stores.

In particular embodiments, one or more data storages may be communicatively linked to one or more servers via one or more links. In particular embodiments, data storages may be used to store various types of information. In particular embodiments, the information stored in data storages may be organized according to specific data structures. In particular embodiments, each data storage may be a relational database. Particular embodiments may provide interfaces that enable servers or clients to manage, e.g., retrieve, modify, add, or delete, the information stored in data storage.

The system may also contain other subsystems and databases, which are not illustrated in FIG. 1, but would be readily apparent to a person of ordinary skill in the art. For example, the system may include databases for storing data, storing features, storing outcomes (training sets), and storing models. Other databases and systems may be added or subtracted, as would be readily understood by a person of ordinary skill in the art, without departing from the scope of the invention.

Figure 2:
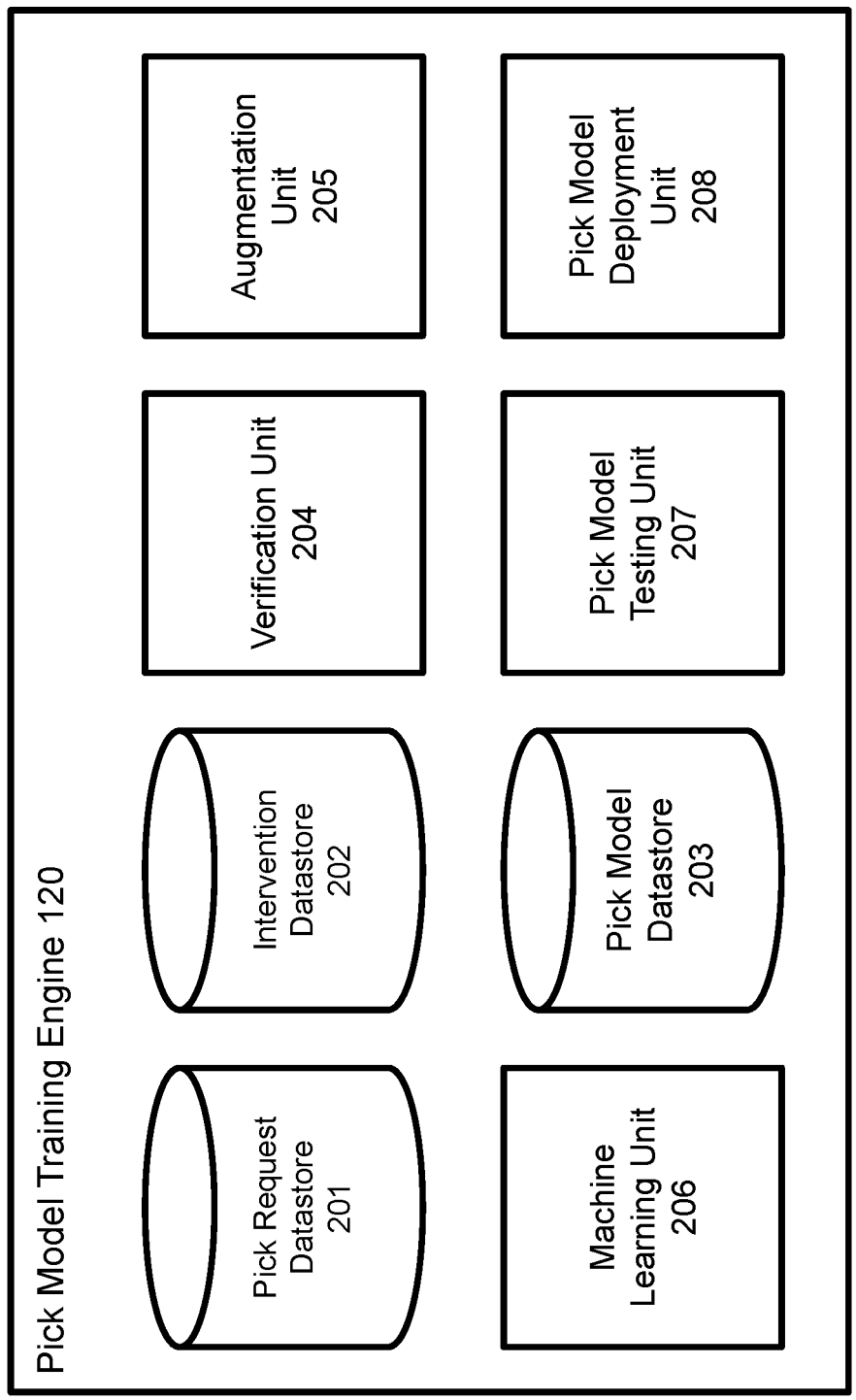
FIG. 2 illustrates a system for pick model training for use in automated robotic picking systems in accordance with an exemplary embodiment of the present invention.

FIG. 2 illustrates an exemplary pick model training engine 120 in accordance with one embodiment of the invention. The pick model training engine 120 comprises a datastore of human generated pickpoint data 201, verification unit 204, augmentation unit 205, machine learning training unit 206, and pick model testing unit 207, and a model deployment unit 208. The system may be reorganized or consolidated, as would be understood by a person of ordinary skill in the art, to provide the same functionality on one or more other servers or computing devices without departing from the scope of the invention Pick request datastore 201 stores pick request data associated with an automated robotic picking system. In general, pick request data comprises data of a pick scene associated with a pick scenario where intervention was requested. Pick request data may comprise 2D and/or 3D data of the pick scene, such as image data and/or depth data. Pick request datastore 201 may store pick request data obtained over time from at least one automated robotic picking system. Pick request datastore 201 may store pick request data associated with a plurality of automated robotic picking systems at a plurality of different locations.

Intervention datastore 202 stores pick data provided by an intervention system, such as intervention system 106. As discussed above, when an automated decision making system, such as vision system 106 encounters certain scenarios, an intervention may be requested. In general, the intervention may comprise providing pick request data of the pick scenario to an intervention system which in turn provides intervention data. The intervention data generally comprises information for use by an automated robotic picking system, such as by vision system 106 to control robotic picking system 114. The intervention data may comprise pick data comprised of at least one of pick point data and classification data. The intervention data may be obtained from an intervention system in association with at least one of human-in-the-loop input and artificial intelligence input. This intervention data may be stored in intervention datastore 202. The intervention data may comprise the associated pick request data. The intervention data may comprise, or be stored with, an indicator identifying the corresponding pick request data with which the intervention data is associated such that the two data sets are stored in association with one another for later retrieval and processing purposes.

Verification unit 204 determines if the intervention data (e.g. pick data obtained from an intervention system) is/was associated with a successful picking operation. In one aspect verification data may be used to determine if/how intervention data can/should be used as training data. In one instance, the verification unit 204 identifies the pick data provided by an intervention system as successful or unsuccessful pick data depending on whether the pick data resulted in a successful pick, movement, and/or placement of an identified object. The intervention data may be labeled and/or associated with an identifier in accordance with the verification status for determining use in a training or re-training dataset.

In one aspect, the verification unit 204 compares subsequent pick requests and/or pick data selections that are sent to a human crew-chief, and if the pick requests look similar (within a threshold) then the verification unit 204 may conclude that the previous pick did not succeed. This comparison may involve comparing the pick request data and/or intervention data against previously provided pick request data and/or intervention data. If the comparison between, for example, consecutive pick request data (or more generally, two picks that are temporally or materially related, i.e. they are requesting picks on a same picking dataset) that are sent to a human crew-chief are the same or similar within a threshold amount, then the verification unit 204 may identify the previously provided intervention data (e.g. human submitted pick data) as being associated with an unsuccessful pick. Similarly, if the comparison between, for example, consecutive (or similar) intervention data submissions by a human crew-chief are on a same or similar (within a threshold) pick request data, then verification unit 204 may identify the former intervention data (e.g. pick point selection) as unsuccessful. In some embodiments, consecutive (or similar) pick requests and/or intervention data may be analyzed to determine if/how pick data provided by a human crew-chief can/should be used for re-training an ML pick model. The picks request data and/or intervention data that is analyzed may be consecutive in one embodiment of the invention. In other embodiments, the pick request data and/or intervention data may be temporally associated and/or materially associated. For example, two pick requests within a threshold period of time may be flagged as being related to the same pick problem. Similarly, image analysis or other data analysis methodologies may be applied to determine if a pick request and/or intervention data is the same or related within a threshold. In one aspect, verification unit 204 obtains a direct indication from at least one of a robotic picking system (such as robotic picking system 114) and a vision system (such as vision system 106) indicating whether a pick was successful or unsuccessful. In response, the verification unit 204 identifies at least one of the corresponding pick request data and intervention data as successful or unsuccessful as appropriate based on the direct indication obtained.

Augmentation unit 205 augments pick request data based on intervention data that is generated by an intervention system. As described above, pick data that is generated by a human crew-chief is generally incomplete and may not be sufficient for use as training or retraining data in an ML system. For example, a human crew-chief may select one or two pick points for picking an object. However, a plurality of pick points may be available for picking an object and the human crew-chief may have identified a subset of the available pick points. In order to improve pick model retraining, it would be beneficial to have a more robust training dataset that identifies a plurality of pick points (as well as bounding boxes, items of interest, etc.) and not just the subset that is provided by the human crew-chief. However, as described above, it is expensive and time consuming to have humans identify additional pick points, bounding boxes, items of interests, etc. for retraining in an ML system. In order to reduce the burden, data augmentation systems may be applied to "fill-in" the additional data. A variety of data augmentation methodologies may be applied, as would be apparent to a person of ordinary skill in the art, without departing from the scope of the invention. In one particular embodiment, the augmentation methodology described in U.S. patent application Ser. No. 17/139,974, (the contents of which are hereby incorporated by reference in their entirety) may be applied to obtain additional pick points, bounding boxes, objects of interest, etc. within a particular pick request. Augmentation unit 204 may label at least one data point in the pick request data as pickable or unpickable. In one aspect, the augmentation unit 205 automatically augments data based on verification status as determined by verification unit 204. For example, in one aspect, augmentation unit 204 only augments pick request data associated with intervention data that resulted in a successful pick as indicated by the verification status. In one aspect, augmentation unit 204 may augment only pick request data associated with intervention data that resulted in an unsuccessful pick as indicated by the verification status. In one aspect, augmentation unit 204 may augment pick request data associated with intervention data that resulted in either successful or unsuccessful picks.

Machine learning unit 206 trains new pick models based on training data comprised of at least one of the pick request data, intervention data, and augmented pick request data. Training may comprise the use of artificial intelligence such as machine learning, neural networks, and/or deep learning. Training of a new model is generally done in a processor using training data and an appropriate learning algorithm. Such algorithms may comprise supervised learning, unsupervised learning, reinforcement learning or the like. In one aspect, machine learning unit 206 may use only data points labeled as pickable, may use only data points labeled as unpickable, or may use a combination of data points labeled as pickable and data points labeled as unpickable as part of the training process. The nature of the data associated with training is such that the data is representative of edge cases where an existing model fails or has a certain degree of uncertainty. As a result, each newly trained pick model may have a unique set of occurrences that it is trained to handle and can be considered a supplementary model to an existing or previously trained model(s). Alternatively, a newly trained model may be an update to and replace an existing or previously trained model.

Pick model datastore 203 may store at least one of current existing pick models (e.g. currently in use), previous pick models (e.g. not currently in use), and new pick models such as pick models trained by machine learning unit 206. Pick model datastore 203 may store pick models for use in training purposes in order to update existing or past pick models based on new training data obtained. Pick model datastore 203 may store at least one supplementary pick model, or updated existing or past pick model for later use in pick model testing and comparison. Pick model datastore 203 may store previous pick models for circumstances such as when a pick model rollback is needed, such as when a newly deployed pick model fails to achieve real world performance consistent with simulated expectations as determined from pick model testing. Pick model datastore 203 may comprise at least one of pick model architecture(s), learned model weights, and the data each pick model was trained on, either in entirety, part, or distilled form.

Pick model testing unit 207 tests each new model to determine its suitability for deployment and use in active picking environments. Each new model may be tested and compared to previous or existing model(s) currently in use (i.e. deployed models). In one embodiment, new model performance is compared with a performance threshold. This threshold may comprise a measure indicating whether the new model outperforms or underperforms with respect to an existing model. The threshold may comprise measures associated with successful picks, successful placement, error rate, number of uncertainties that arise, and the like. In other embodiments, pick models may be compared on the distribution of scenarios they are able to handle. New models that handle scenarios not currently covered by deployed models (or handling them better), may be deployed alongside and supplementary to, those models already in use. A secondary model may be trained to route requests between the models. In one embodiment, testing may comprise collecting and storing one or more datasets of an active pick scene from a vision system over a period of active robotic picking operations, then replaying these one or more datasets in a simulated environment where multiple models are executed and compared against each other in order to assess which model best handles the one or more datasets. This testing may be in place of or in addition to the above listed testing approaches.

Pick model deployment unit 208 controls deployment of models for use by automated robotic picking systems. As discussed above, new model training may result in a plurality of supplementary models that pick up where a previous model left off and addresses edge cases associated with existing models. In this way, deployment unit 208 may deploy an ensemble of models wherein each model has been trained to handle certain scenarios. Alternatively, a newly trained model that updates an existing model and serves as a replacement model may be deployed in which case the previous model is removed from deployment. Deployment unit 208 may deploy a model(s) in a cloud environment such that automated robotic picking systems may automatically begin using new models as they are deployed by interfacing with the cloud without requiring the automated robotic picking system to be updated to the latest model version. Alternatively, the deployment unit 208 may push the new models in a downloaded form to update individual automated robotic picking systems.

Figure 3:
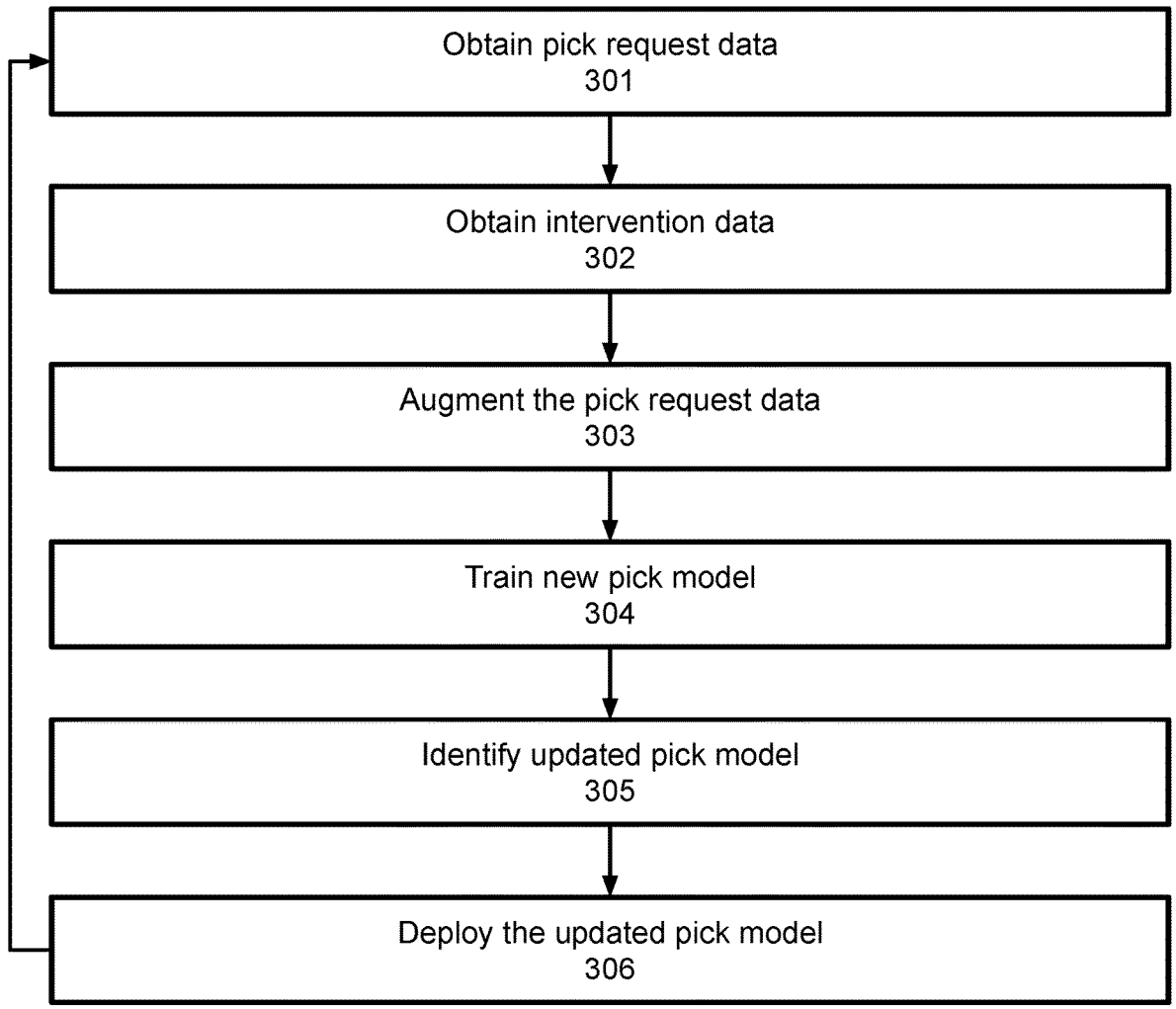
FIG. 3 illustrates an exemplary process for training a pick model according to one embodiment of the invention.

FIG. 3 illustrates an exemplary embodiment of a process for retraining a machine learning model for automated robotic picking. The process comprises obtaining pick request data 301, obtaining intervention data 302, augmenting pick request data 303, training a new pick model 304, identifying an updated pick model 305, and deploying the updated pick model 306. The steps may be reordered or consolidated, without departing from the scope of the invention, as would be apparent to one of ordinary skill in the art. Furthermore, any of the listed steps may be optional depending on the particular application of the inventive concept as would be apparent to one of ordinary skill in the art.

During an automated robotic picking process using a trained machine learning algorithm, an automated robotic picking system periodically encounters circumstances requiring assistance, such as human-in-the-loop assistance. For example, a vision system associated with a robotic picking system may provide identified pick data, such as pick point data or classification data, for a robotic arm to use to pick an object. When the vision system is unable to decide on pick data with a sufficient degree of certainty or when the pick data provided by the vision system is not actionable by the robotic arm, the robotic picking system may request intervention such as human response data from a human-in-the-loop crew chief overseeing the robotic picking operations. The following process provides an exemplary approach to take advantage of the above scenarios to gather training data and train new picking models.

At step 301, the process may obtain pick request data associated with a pick scenario. The pick request data may be associated with a pick scenario where an automated pick identification system, such as a vision system employing an existing pick model, is unable to determine, with sufficient confidence, pick data for the given pick scenario. These scenarios may be the result of a variety of circumstances including, but not limited to, deficiencies in existing pick models (e.g. unable to handle certain scenarios, unable to identify pick points, unable to decide between two or more similar pick options, etc.), the result of a malfunction or previous pick which caused disruption of a pick scene (e.g. objects were knocked over), a vision system or current pick model failing to identify any objects in the pick scene, etc. The pick request data may comprise 2D and/or 3D data of the pick scene, such as image data and/or depth data. The pick request data may comprise pick data as determined by an automated picking system employing an existing pick model. The pick request data may comprise an indication that no pick data has been identified or determined by an automated picking system employing an existing pick model. The pick request data may be obtained by a computing device configured for processing the obtained data, such as pick model training engine 120 of FIGS. 1-2 discussed above. The pick request data may be obtained from a datastore or database such as pick request datastore 201 depicted in FIG. 2. The pick request data may be obtained in real-time as the data is generated, such as when the pick request data is provided to an intervention system, such as intervention system 108 depicted in FIG. 1.

At step 302, the process may obtain intervention data associated with a pick scenario. Intervention data may comprise pick data generated via an intervention system, such as intervention system 108, in response to review and/or processing of pick request data. Intervention data may comprise at least one of identified pick data and confirmed pick data. Identified pick data may comprise at least one of human response data and artificial intelligence response data. For example, an intervention system (such as intervention system 108) may obtain pick request data which is reviewed and/or analyzed by at least one of a human-in-the-loop and an artificial intelligence system in order to identify pick data to be used in a picking operation executed by a robotic picking system. Confirmed pick data may comprise automatically generated pick data which has been confirmed by at least one of a human or an artificial intelligence system as suitable for use in a robotic picking operation. For example, an intervention system may obtain pick request data which comprises pick data that was determined by an automated decision system employing an existing pick model, such as a vision system (e.g. vision system 106). The pick data determined by the automated decision system may be provided to the intervention system for review and/or analysis by a human or artificial intelligence system. The human or artificial intelligence system may confirm that pick data determined by the automated decision system appears appropriate for use in a picking operation and thus the pick data is confirmed.

In one aspect, obtaining intervention data may comprise obtaining verification data providing an indication whether the intervention data was used by an automated robotic picking system to successfully pick and/or move an identified object. For example, when intervention data is used by an automated robotic picking system to grab and move an identified object from a pick location (optionally without disruption of other objects in the pick area), the intervention data may be associated with an indicator (e.g. a tag, label, etc.) indicating that the intervention data resulted in a successful picking operation. Similarly, when intervention data used by an automated robotic picking system failed to grab and move and identified object and/or resulted in disruption of other objects in the pick area, the intervention data may be associated with an indicator (e.g. a tag, label, etc.) indicating that the intervention data did not result in a successful picking operation. In this way, the intervention data can be filtered such that pick data that resulted in successful picking operations can be differentiated from pick data that did not result in successful picking operations. As discussed in more detail below, different training approaches may use at least one of successful and/or unsuccessful pick data as part of the training process depending on the training goal as would be apparent to one of ordinary skill in the art.

At step 303 the process may comprise augmenting the obtained pick request data in order to improve the data's usefulness for training purposes. In general, augmenting comprises labeling at least one data point in the pick request data which is not associated with a label. In one aspect, augmenting comprises labeling all data points in the pick request data which are not associated with a label. In general, for model training purposes, a completely labeled data set is preferable to an incomplete or partially labeled data set. While training may be possible with a partially labeled data set, a fully labeled data set generally leads to improved training results.

Augmenting may comprise labeling the pick request data based on the intervention data. In general, intervention data may identify one or more pick points in the pick request data that are associated with an object, however there are often many more pick points associated with the object which could be used as pick data in an automated picking process. For example, intervention data may identify four corners of an object or an outline of an object as the pick data. In addition to these identified points associated with the boundaries of an object, many data points within these outermost boundaries of an object are also associated with the object and may serve as suitable pick data. Similarly, intervention data may identify pick data located inside the outer boundaries of an object, such as at the approximate center of an object, however in addition to these more central points, many data points between the center and the outermost boundaries of an object may be suitable pick data. Therefore, the intervention data may be used as a guide or starting point for identifying additional pick data within the pick request data. Labeling the additional pick data provides an augmented data set for use in later training processes. This approach to augment the pick request data allows not only the data points identified by the intervention data to be labeled, but also these additional data points to be labeled thereby increasing the quantity and/or quality of the data available to be used for training purposes. In one aspect, augmenting may comprise combining a plurality of intervention data sets and/or pick request data sets together. For example, augmenting may comprise combining subsets of different data sets (e.g. image crops) together to create an augmented data set for use in training.

At step 304, the process comprises training a new pick model using at least one of obtained pick request data, obtained intervention data, and augmented pick request data. Training may comprise the use of artificial intelligence such as machine learning, neural networks, and/or deep learning. In one aspect, at least one of obtained pick request data, obtained intervention data, and augmented pick request data may serve as inputs for the artificial intelligence processing and training. Training a new pick model may comprise using an existing pick model (or training data used in generating, or derived from, the existing pick model) in combination with at least one of the obtained pick request data, obtained intervention data, and augmented pick request data. Training a new pick model may comprise training a new pick model capable of handling the pick scenarios where an existing model failed or where an existing model required intervention (e.g. a pick scenario where intervention was requested). Training a new pick model may comprise training a new model as a supplementary pick model to be used in addition to at least one existing pick model. Training a new pick model may comprise retraining an existing pick model to be used as a replacement for at least one existing pick model.

Training a new pick model may be performed at various time periods as would be apparent to one of ordinary skill in the art. In one aspect, training a new pick model may be performed after obtaining a threshold amount of at least one of pick request data and intervention data. For example, new model training may be performed after obtaining a determined number of data points or after obtaining a determined amount of pick request data sets and/or intervention data sets. In one aspect, training a new pick model may be performed after certain time periods using at least one of the pick request data and intervention data obtained during that time period. For example, training a new pick model may occur daily, weekly, monthly, after a robotic picking session has been completed, etc., using at least one of the pick request data and intervention data obtained during the respective day, week, month, robotic picking session, etc. In one aspect, training a new pick model may be initiated in an on-demand fashion, such as by a human (e.g. overseer, crew chief, etc.) triggering a retraining process. In one aspect, training a new pick model may be triggered based on at least one metric of the underlying data such as an amount of data drift associated with at least one feature of at least one of the pick request data and intervention data. Metrics of the underlying data may comprise at least one statistical characteristics (e.g. mean, variance, etc.) of at least one of raw images associated with the pick request data, individual pixel values associated with the pick request data, and feature data extracted from the pick request data (e.g. via a feature extractor or feature extraction process), such as at least one of identified corners, lines, and one or more layers of a neural network (e.g. the first few layers).

Training a new pick model may be based on the verification data associated with the intervention data. In one aspect, training of a new pick model may be based solely on pick data that resulted in successful picking operations. In one aspect, training of a new pick model may be based solely on pick data that failed to result in successful picking operations. In one aspect, training of a new pick model may be based on a combination of successful and unsuccessful pick data.

At step 305, an updated pick model may be identified for deployment and/or use in automated robotic picking operations. Identifying an updated pick model may comprise identifying at least one of an existing pick model and a new pick model (e.g. a new supplementary pick model, a new retrained pick model). Identifying an updated pick model may comprise testing a new pick model performance. In one aspect, testing new pick model performance comprises determining if the new pick model exceeds a performance metric. The performance metric may comprise at least one of an expected performance threshold and a performance metric associated with the existing pick model being used by the automated robotic picking system. The performance metric may comprise measures associated with at least one of successful picks, successful placement, error rate, number of uncertainties that arise, and the like. In one aspect, the performance metric may be determined from a simulation process in order to compute the pick model's ability to handle a variety of pick scenarios. The expected performance threshold may comprise a minimum amount (e.g. number, percentage) of pick scenarios for which the simulation indicates that the pick model appropriately identified pick data. The expected performance threshold may comprise at least one of a maximum number of errors and number of uncertainties that arise as part of the simulation process. In one aspect, the performance metric associated with the new pick model, as determined from the simulation process, may be compared with a performance metric from an existing pick model (whose performance metric may be based on at least one of a simulation process or non-simulated, actual automated robotic picking operations using the existing pick model).

At step 306, the updated pick model may be deployed for use in automated robotic picking operations. Deploying an updated pick model may be done as described above with respect to pick model deployment unit 208. In general, deploying comprises making a new or updated pick model available for use by robotic picking systems. Deploying may comprise at least one of updating an existing pick model, replacing an existing pick model, removing an existing pick model, and adding a pick model as a supplement to an existing pick model. In one aspect, deploying comprises updating at least one automated robotic picking system, such as a vision system, to use the updated pick model. In one aspect, deploying comprises providing the updated model via a cloud based environment for automated robotic picking systems to download or access in real-time as necessary (such as when an existing, previously installed pick model encounters an issue).

After the updated pick model has been deployed the process may repeat wherein subsequent steps of obtaining pick request data, intervention data, and so on are associated with "failures" or inadequacies associated with the updated pick model. This iterative process allows for the continued gathering of new training data which can be used to address new edge cases which arise with each new pick model update. Ultimately, this ongoing process may lead to continually improving the automated decision making process through the repeated gathering of new pick scenarios requiring intervention, so that, ideally, the number of scenarios requiring intervention continues to become fewer and fewer as the training data gathering and training process repeats over time.

Although described herein with reference to robotic picking and pick model training, the above system and method could be adapted to various other autonomous decision making systems. The approaches disclosed herein could be used to train and/or update any model by periodically providing new training data, verifying accuracy of the new training data, augmenting the training data to provide completely labeled data, and training and testing a new model. For example, within the context of robotic picking operations, the above approaches may be applied models associated with object placement, pick object classification, and path planning, but may also be applied more generally outside of robotic picking such as models involving planning, speech recognition, classification, etc., applied to make decisions for other applications.

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the embodiments disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific embodiments, at least some of the features or functionalities of the various embodiments disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some embodiments, at least some of the features or functionalities of the various embodiments disclosed herein may be implemented in one or more virtualized computing environments (e.g., network computing clouds, virtual machines hosted on one or more physical computing machines, or other appropriate virtual environments). Any of the above mentioned systems, units, modules, engines, controllers, components or the like may be and/or comprise hardware and/or software as described herein. For example, the pick model training engine 120 and subcomponents thereof may be and/or comprise computing hardware and/or software as described herein in association with FIGS. 4-7. Furthermore, any of the above mentioned systems, units, modules, engines, controllers, components, interfaces or the like may use and/or comprise an application programming interface (API) for communicating with other systems units, modules, engines, controllers, components, interfaces or the like for obtaining and/or providing data or information.

Figure 4:
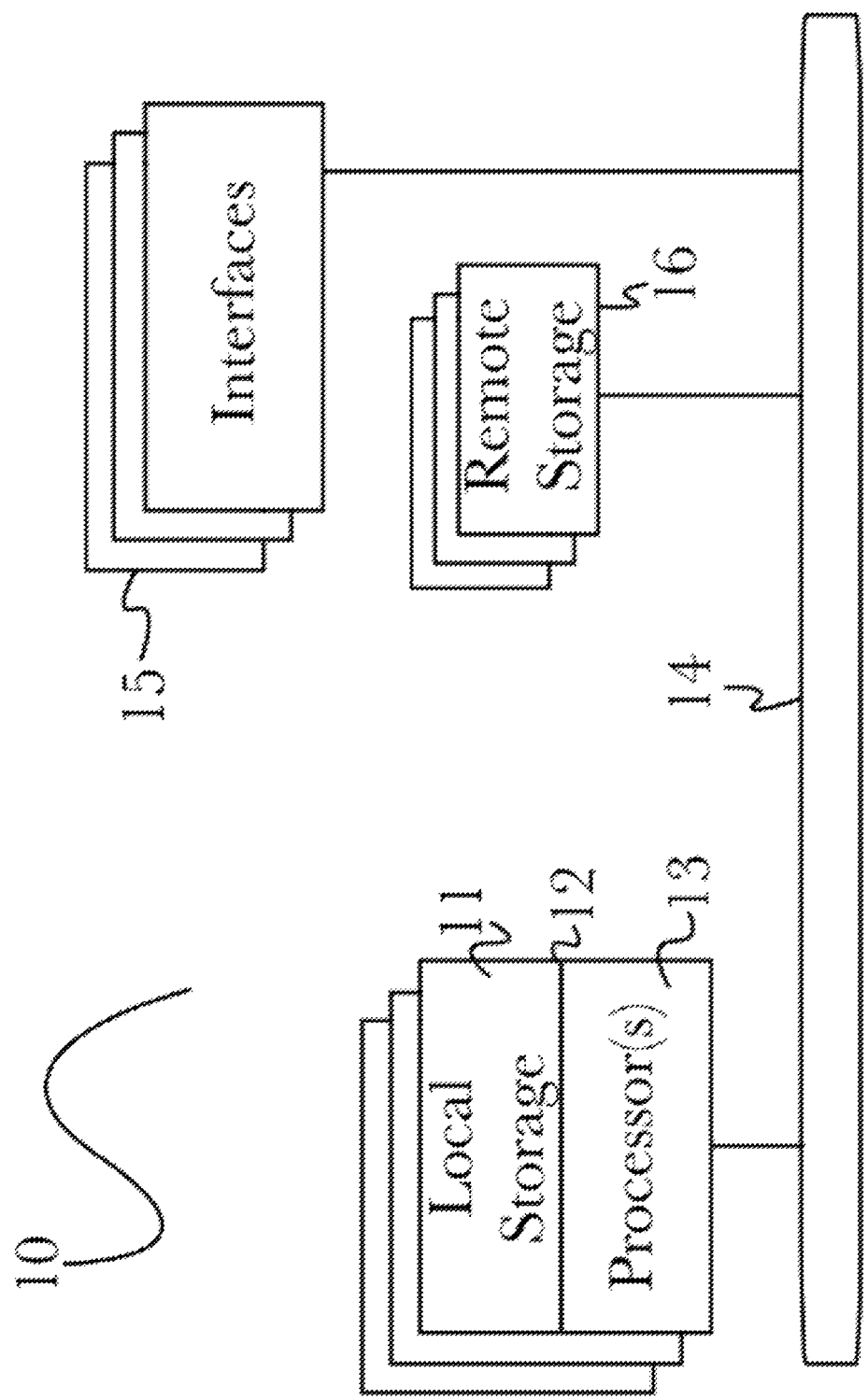
FIG. 4 illustrates one embodiment of the computing architecture that supports an embodiment of the inventive disclosure.

Referring now to FIG. 4, there is shown a block diagram depicting an exemplary computing device 10 suitable for implementing at least a portion of the features or functionalities disclosed herein. Computing device 10 may be, for example, any one of the computing machines listed in the previous paragraph, or indeed any other electronic device capable of executing software- or hardware-based instructions according to one or more programs stored in memory. Computing device 10 may be configured to communicate with a plurality of other computing devices, such as clients or servers, over communications networks such as a wide area network a metropolitan area network, a local area network, a wireless network, the Internet, or any other network, using known protocols for such communication, whether wireless or wired.

In one aspect, computing device 10 includes one or more central processing units (CPU) 12, one or more interfaces 15, and one or more busses 14 (such as a peripheral component interconnect (PCI) bus). When acting under the control of appropriate software or firmware, CPU 12 may be responsible for implementing specific functions associated with the functions of a specifically configured computing device or machine. For example, in at least one aspect, a computing device 10 may be configured or designed to function as a server system utilizing CPU 12, local memory 11 and/or remote memory 16, and interface(s) 15. In at least one aspect, CPU 12 may be caused to perform one or more of the different types of functions and/or operations under the control of software modules or components, which for example, may include an operating system and any appropriate applications software, drivers, and the like.

CPU 12 may include one or more processors 13 such as, for example, a processor from one of the Intel, ARM, Qualcomm, and AMD families of microprocessors. In some embodiments, processors 13 may include specially designed hardware such as application-specific integrated circuits (ASICs), electrically erasable programmable read-only memories (EEPROMs), field-programmable gate arrays (FPGAs), and so forth, for controlling operations of computing device 10. In a particular aspect, a local memory 11 (such as non-volatile random-access memory (RAM) and/or read-only memory (ROM), including for example one or more levels of cached memory) may also form part of CPU 12. However, there are many different ways in which memory may be coupled to system 10. Memory 11 may be used for a variety of purposes such as, for example, caching and/or storing data, programming instructions, and the like. It should be further appreciated that CPU 12 may be one of a variety of system-on-a-chip (SOC) type hardware that may include additional hardware such as memory or graphics processing chips, such as a QUALCOMM SNAPDRAGON™ or SAMSUNG EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one aspect, interfaces 15 are provided as network interface cards (NICs). Generally, NICs control the sending and receiving of data packets over a computer network; other types of interfaces 15 may for example support other peripherals used with computing device 10. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (WiFi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 15 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown in FIG. 4 illustrates one specific architecture for a computing device 10 for implementing one or more of the embodiments described herein, it is by no means the only device architecture on which at least a portion of the features and techniques described herein may be implemented. For example, architectures having one or any number of processors 13 may be used, and such processors 13 may be present in a single device or distributed among any number of devices. In one aspect, single processor 13 handles communications as well as routing computations, while in other embodiments a separate dedicated communications processor may be provided. In various embodiments, different types of features or functionalities may be implemented in a system according to the aspect that includes a client device (such as a tablet device or smartphone running client software) and server systems (such as a server system described in more detail below).

Regardless of network device configuration, the system of an aspect may employ one or more memories or memory modules (such as, for example, remote memory block 16 and local memory 11) configured to store data, program instructions for the general-purpose network operations, or other information relating to the functionality of the embodiments described herein (or any combinations of the above). Program instructions may control execution of or comprise an operating system and/or one or more applications, for example. Memory 16 or memories 11, 16 may also be configured to store data structures, configuration data, encryption data, historical system operations information, or any other specific or generic non-program information described herein.

Because such information and program instructions may be employed to implement one or more systems or methods described herein, at least some network device embodiments may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a JAVA™ compiler and may be executed using a Java virtual machine or equivalent, or files containing higher level code that may be executed by the computer using an interpreter (for example, scripts written in Python, Perl, Ruby, Groovy, or any other scripting language).

Figure 5:
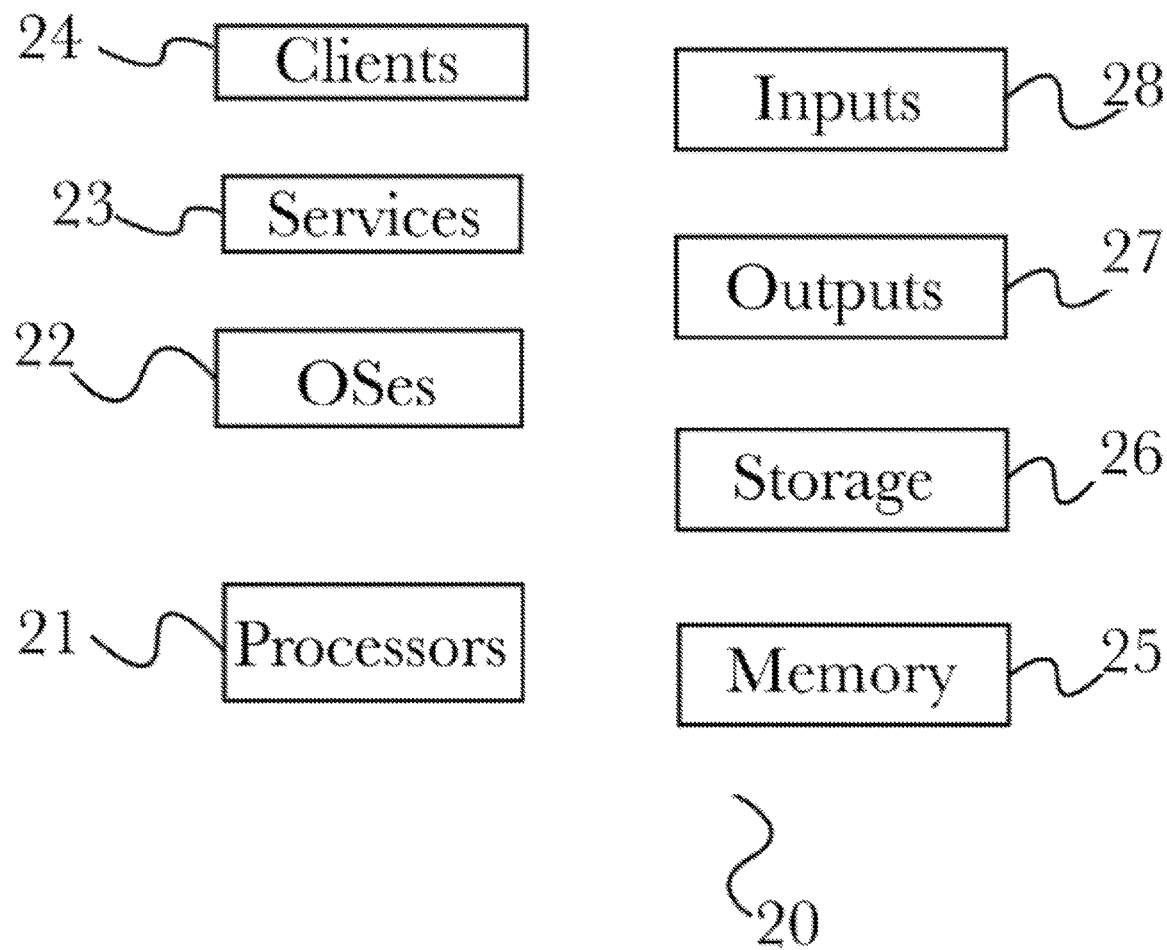
FIG. 5 illustrates components of a system architecture that supports an embodiment of the inventive disclosure.

In some embodiments, systems may be implemented on a standalone computing system. Referring now to FIG. 5, there is shown a block diagram depicting a typical exemplary architecture of one or more embodiments or components thereof on a standalone computing system. Computing device 20 includes processors 21 that may run software that carry out one or more functions or applications of embodiments, such as for example a client application 24. Processors 21 may carry out computing instructions under control of an operating system 22 such as, for example, a version of MICROSOFT WINDOWS™ operating system, APPLE macOS™ or iOS™ operating systems, some variety of the Linux operating system, ANDROID™ operating system, or the like. In many cases, one or more shared services 23 may be operable in system 20, and may be useful for providing common services to client applications 24. Services 23 may for example be WINDOWS™ services, user-space common services in a Linux environment, or any other type of common service architecture used with operating system 21. Input devices 28 may be of any type suitable for receiving user input, including for example a keyboard, touchscreen, microphone (for example, for voice input), mouse, touchpad, trackball, or any combination thereof. Output devices 27 may be of any type suitable for providing output to one or more users, whether remote or local to system 20, and may include for example one or more screens for visual output, speakers, printers, or any combination thereof. Memory 25 may be random-access memory having any structure and architecture known in the art, for use by processors 21, for example to run software. Storage devices 26 may be any magnetic, optical, mechanical, memristor, or electrical storage device for storage of data in digital form (such as those described above, referring to FIG. 4). Examples of storage devices 26 include flash memory, magnetic hard drive, CD-ROM, and/or the like.

Figure 6:
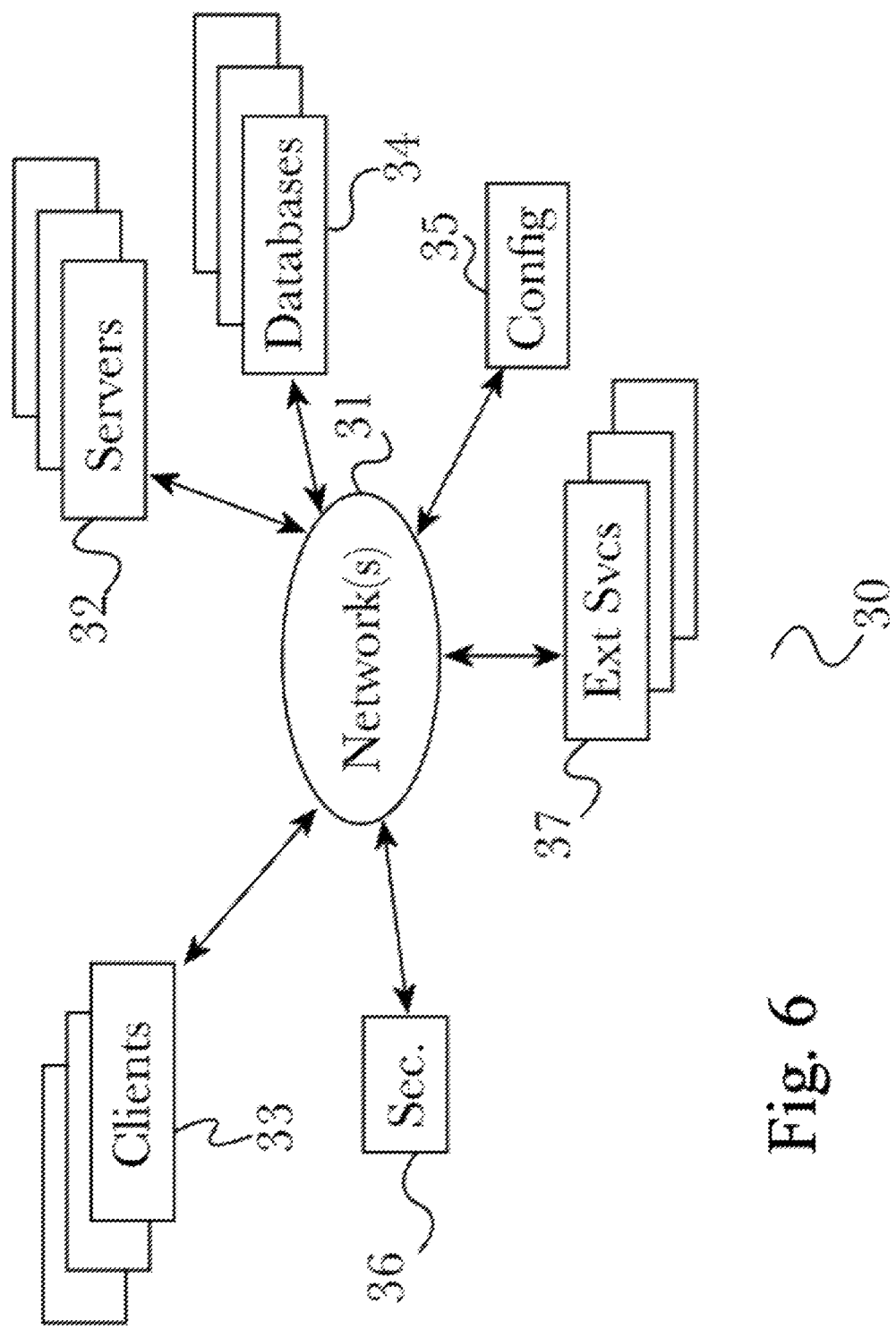
FIG. 6 illustrates components of a computing device that supports an embodiment of the inventive disclosure.

In some embodiments, systems may be implemented on a distributed computing network, such as one having any number of clients and/or servers. Referring now to FIG. 6, there is shown a block diagram depicting an exemplary architecture 30 for implementing at least a portion of a system according to one aspect on a distributed computing network. According to the aspect, any number of clients 33 may be provided. Each client 33 may run software for implementing client-side portions of a system; clients may comprise a system 20 such as that illustrated in FIG. 6. In addition, any number of servers 32 may be provided for handling requests received from one or more clients 33. Clients 33 and servers 32 may communicate with one another via one or more electronic networks 31, which may be in various embodiments any of the Internet, a wide area network, a mobile telephony network (such as CDMA or GSM cellular networks), a wireless network (such as WiFi, WiMAX, LTE, and so forth), or a local area network (or indeed any network topology known in the art; the aspect does not prefer any one network topology over any other). Networks 31 may be implemented using any known network protocols, including for example wired and/or wireless protocols.

In addition, in some embodiments, servers 32 may call external services 37 when needed to obtain additional information, or to refer to additional data concerning a particular call. Communications with external services 37 may take place, for example, via one or more networks 31. In various embodiments, external services 37 may comprise web-enabled services or functionality related to or installed on the hardware device itself. For example, in one aspect where client applications 24 are implemented on a smartphone or other electronic device, client applications 24 may obtain information stored in a server system 32 in the cloud or on an external service 37 deployed on one or more of a particular enterprise's or user's premises.

In some embodiments, clients 33 or servers 32 (or both) may make use of one or more specialized services or appliances that may be deployed locally or remotely across one or more networks 31. For example, one or more databases 34 may be used or referred to by one or more embodiments. It should be understood by one having ordinary skill in the art that databases 34 may be arranged in a wide variety of architectures and using a wide variety of data access and manipulation means. For example, in various embodiments one or more databases 34 may comprise a relational database system using a structured query language (SQL), while others may comprise an alternative data storage technology such as those referred to in the art as "NoSQL" (for example, HADOOP CASSANDRA™, GOOGLE BIGTABLE™, and so forth). In some embodiments, variant database architectures such as column-oriented databases, in-memory databases, clustered databases, distributed databases, or even flat file data repositories may be used according to the aspect. It will be appreciated by one having ordinary skill in the art that any combination of known or future database technologies may be used as appropriate, unless a specific database technology or a specific arrangement of components is specified for a particular aspect described herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, some embodiments may make use of one or more security systems 36 and configuration systems 35. Security and configuration management are common information technology (IT) and web functions, and some amount of each are generally associated with any IT or web systems. It should be understood by one having ordinary skill in the art that any configuration or security subsystems known in the art now or in the future may be used in conjunction with embodiments without limitation, unless a specific security 36 or configuration system 35 or approach is specifically required by the description of any specific aspect.

Figure 7:
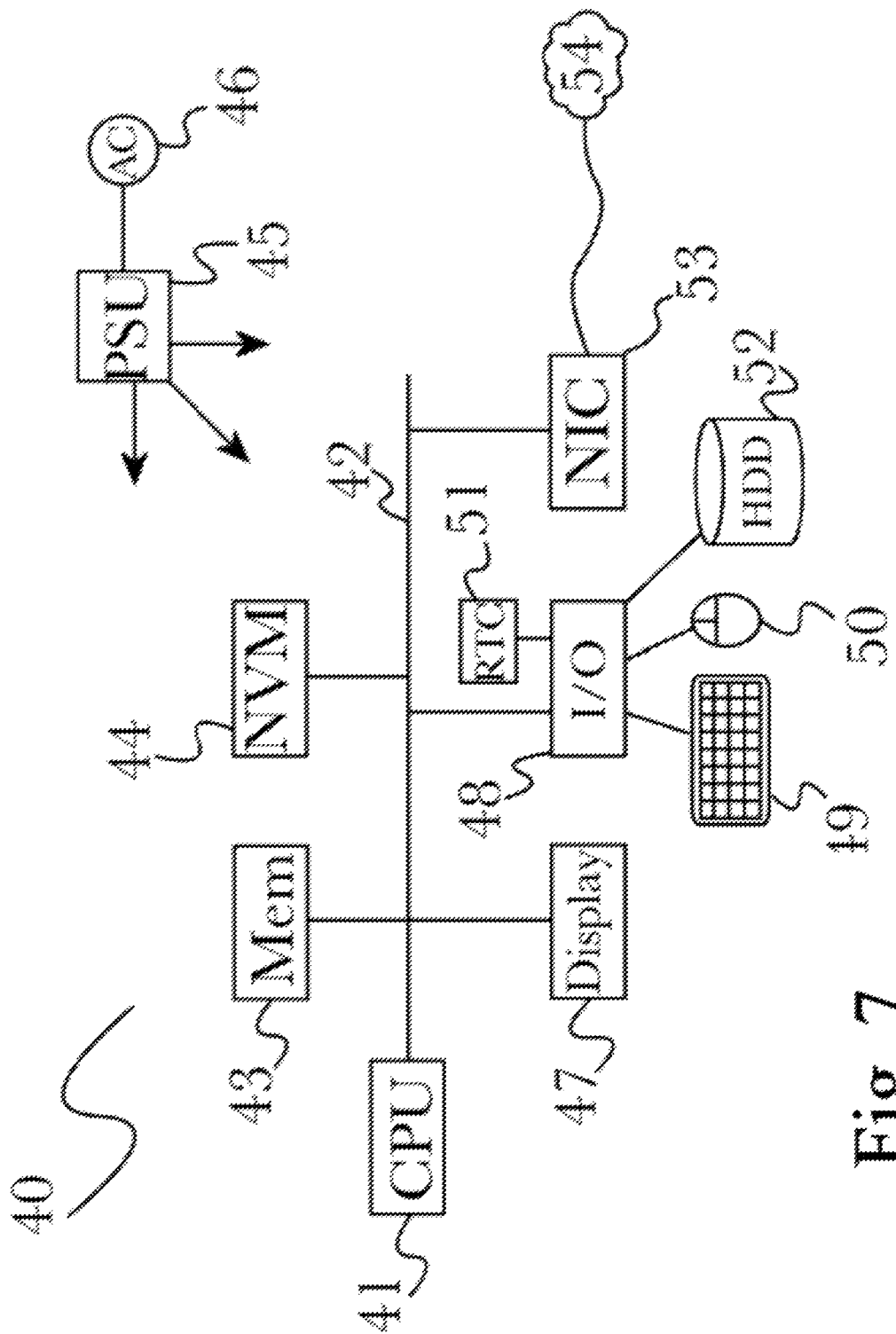
FIG. 7 illustrates components of a computing device that supports an embodiment of the inventive disclosure.

FIG. 7 shows an exemplary overview of a computer system 40 as may be used in any of the various locations throughout the system. It is exemplary of any computer that may execute code to process data. Various modifications and changes may be made to computer system 40 without departing from the broader scope of the system and method disclosed herein. Central processor unit (CPU) 41 is connected to bus 42, to which bus is also connected memory 43, nonvolatile memory 44, display 47, input/output (I/O) unit 48, and network interface card (NIC) 53. I/O unit 48 may, typically, be connected to keyboard 49, pointing device 50, hard disk 52, and real-time clock 51. NIC 53 connects to network 54, which may be the Internet or a local network, which local network may or may not have connections to the Internet. Also shown as part of system 40 is power supply unit 45 connected, in this example, to a main alternating current (AC) supply 46. Not shown are batteries that could be present, and many other devices and modifications that are well known but are not applicable to the specific novel functions of the current system and method disclosed herein. It should be appreciated that some or all components illustrated may be combined, such as in various integrated applications, for example Qualcomm or Samsung system-on-a-chip (SOC) devices, or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various embodiments, functionality for implementing systems or methods of various embodiments may be distributed among any number of client and/or server components. For example, various software modules may be implemented for performing various functions in connection with the system of any particular aspect, and such modules may be variously implemented to run on server and/or client components.

The skilled person will be aware of a range of possible modifications of the various embodiments described above. Accordingly, the present invention is defined by the claims and their equivalents.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for creating an interactive message through the disclosed principles herein. Thus, while particular embodiments and applications have been illustrated and described, it is to be understood that the disclosed embodiments are not limited to the precise construction and components disclosed herein. Various apparent modifications, changes and variations may be made in the arrangement, operation and details of the method and apparatus disclosed herein without departing from the spirit and scope defined in the appended claims.

What is claimed is:

1. A computer implemented method for training or retraining machine learning models for picking objects in an automated robotic picking environment, the computer implemented method comprising:

obtaining pick request data associated with an automated robotic picking system, the pick request data identifying a pick scenario where intervention was requested, the pick scenario comprising a scenario where an existing pick model being used by the automated robotic picking system was unable to determine pick data that would result in a successful pick;

obtaining intervention data that resulted in a successful pick by the automated robotic picking system, the intervention data comprising human provided pick data that was provided in response to the requested intervention, wherein the intervention data comprises labeled pick request data;

automatically, in response to obtaining the intervention data, augmenting the labeled pick request data, wherein augmenting comprises determining at least one data point in the pick request data that is not associated with a label and assigning a label to the at least one data point in the pick request data that is not associated with a label, wherein each label indicates whether the corresponding data point is associated with a point on an object where the automated robotic picking system can interface the object in order to pick the object or whether the corresponding data point is associated with a point where the automated robotic picking system cannot interface the object in order to pick the object;

training a new pick model using the augmented pick request data, wherein the new pick model is trained to address at least the pick scenario where intervention was requested;
identifying an updated pick model for use by the automated robotic picking system, the identifying comprising testing the new pick model performance.

2. The computer implemented method according to claim 1, the identified updated pick model comprising at least one of the existing pick model and the new pick model.

3. The computer implemented method according to claim 1, wherein testing the new pick model comprises determining if the new pick model exceeds a performance metric, wherein the performance metric comprises at least one of an expected performance threshold and a performance metric associated with the existing pick model being used by the automated robotic picking system.

4. The computer implemented method according to claim 1, further comprising deploying the identified updated pick model for use by the automated robotic picking system, wherein deploying the updated pick model comprises at least one of replacing the existing pick model with the new pick model and deploying the new pick model as a supplementary pick model to the existing pick model.

5. The computer implemented method according to claim 1, wherein training the new pick model comprises training the new pick model after a threshold amount of augmented pick request data is obtained, the threshold amount comprising at least one of a specified number of data points, an amount of data obtained over a threshold period of time, and an amount of data drift associated with at least one feature of the pick request data.

6. The computer implemented method according to claim 1, wherein training the new pick model comprises using at least the intervention data and the augmented pick request data.

7. The computer implemented method according to claim 1, wherein obtaining intervention data that resulted in a successful pick by the automated robotic picking system comprises obtaining verification data, wherein the verification data comprises an indication that the human provided pick data was used by the automated robotic picking system to achieve a successful pick.

8. The computer implemented method of claim 1, wherein the pick request data comprises at least one of image data and three dimensional depth data of a pick location associated with the automated robotic picking system.

9. The computer implemented method according to claim 1, wherein obtaining intervention data comprises presenting the pick request data to a human-in-the-loop via an intervention system and obtaining human provided pick data associated with the pick request data via the intervention system, wherein the intervention system is located at a remote location relative to the automated robotic picking system.

10. The computer implemented method of claim 1, the human provided pick data comprising at least one of human generated pick data and vision system generated pick data that was confirmed by a human.

11. The computer implemented method of claim 10, wherein the human provided pick data is different than the vision system generated pick data.

12. The computer implemented method of claim 10, wherein the vision system is at least one of incorporated into the automated robotic picking system, located in proximity to the automated robotic picking system, and located such that the vision system is operable to obtain at least one of image data and three dimensional depth data of a pick location associated with the automated robotic picking system.

13. The computer implemented method of claim 1, wherein the scenario where an existing pick model being used by the automated robotic picking system was unable to determine pick data that would result in a successful pick comprises at least one of a scenario where the existing pick model is unable to determine pick data and a scenario where the pick data determined by the existing pick model is associated with a confidence value below a minimum confidence threshold.

14. The computer implemented method of claim 1, wherein obtaining pick request data and obtaining intervention data are performed in association with a plurality of automated robotic picking systems at a plurality of different locations.

15. The computer implemented method of claim 14, wherein training a new model comprises using the obtained pick request data associated with the plurality of automated robotic picking systems at a plurality of different locations.

16. The computer implemented method according to claim 1, wherein augmenting comprises assigning a label to each data point in the pick request data that is not associated with a label.

17. The computer implemented method according to claim 1, further comprising iterating the process by repeating at least the obtaining pick request data step, the obtaining intervention data step, the augmenting the pick request data step, and the training a new model step in order to train at least one additional new pick model.

18. The computer implemented method according to claim 17, the at least one additional new pick model trained to address at least one scenario where at least one previously trained pick model being used by the automated robotic picking system was unable to determine pick data that would result in a successful pick.

19. A system for training or retraining machine learning models for picking objects in an automated robotic picking environment, the system comprising:
control circuitry configured to perform a method comprising:
obtaining pick request data associated with an automated robotic picking system, the pick request data identifying a pick scenario where intervention was requested, the pick scenario comprising a scenario where an existing pick model being used by the automated robotic picking system was unable to determine pick data that would result in a successful pick;
obtaining intervention data that resulted in a successful pick by the automated robotic picking system, the intervention data comprising human provided pick data that was provided in response to the requested intervention, wherein the intervention data comprises labeled pick request data;
automatically, in response to obtaining the intervention data, augmenting the labeled pick request data, wherein augmenting comprises determining at least one data point in the pick request data that is not associated with a label and assigning a label to the at least one data point in the pick request data that is not associated with a label, wherein each label indicates whether the corresponding data point is associated with a point on an object where the automated robotic picking system can interface the object in order to pick the object or whether the corresponding data point is associated with a point where the automated robotic picking system cannot interface the object in order to pick the object;

training a new pick model using the augmented pick request data, wherein the new pick model is trained to address at least the pick scenario where intervention was requested;

identifying an updated pick model for use by the automated robotic picking system, the identifying comprising testing the new pick model performance.

20. A non-transitory computer readable medium comprising instructions that, when executed by a processor, cause the processor to perform a method for training or retraining machine learning models for picking objects in an automated robotic picking environment, the method comprising:

obtaining pick request data associated with an automated robotic picking system, the pick request data identifying a pick scenario where intervention was requested, the pick scenario comprising a scenario where an existing pick model being used by the automated robotic picking system was unable to determine pick data that would result in a successful pick;

obtaining intervention data that resulted in a successful pick by the automated robotic picking system, the intervention data comprising human provided pick data that was provided in response to the requested intervention, wherein the intervention data comprises labeled pick request data;

automatically, in response to obtaining the intervention data, augmenting the labeled pick request data, wherein augmenting comprises determining at least one data point in the pick request data that is not associated with a label and assigning a label to the at least one data point in the pick request data that is not associated with a label, wherein each label indicates whether the corresponding data point is associated with a point on an object where the automated robotic picking system can interface the object in order to pick the object or whether the corresponding data point is associated with a point where the automated robotic picking system cannot interface the object in order to pick the object;

training a new pick model using the augmented pick request data, wherein the new pick model is trained to address at least the pick scenario where intervention was requested;

identifying an updated pick model for use by the automated robotic picking system, the identifying comprising testing the new pick model performance.

* * * * *